(12) United States Patent
Moon et al.

(10) Patent No.: US 7,616,415 B2
(45) Date of Patent: Nov. 10, 2009

(54) ELECTROSTATIC DISCHARGE PROTECTION CIRCUIT AND ELECTROSTATIC DISCHARGE PROTECTION METHOD OF A SEMICONDUCTOR MEMORY DEVICE

(75) Inventors: Jung Eon Moon, Kyoungki-do (KR); Dae Gwan Kang, Seoul (KR); Kook Whee Kwak, Kyoungki-do (KR); Nak Heon Choi, Kyoungki-do (KR); Si Woo Lee, Kyoungki-do (KR); Hee Jeong Son, Seoul (KR); Suk Yun, Kyoungki-do (KR); Seong Hoon Jeong, Kyoungki-do (KR); Joon Won Lee, Kyoungdi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 110 days.

(21) Appl. No.: 11/735,038

(22) Filed: Apr. 13, 2007

(65) Prior Publication Data
US 2007/0242401 A1 Oct. 18, 2007

(30) Foreign Application Priority Data
Apr. 14, 2006 (KR) ........................ 10-2006-0034092

(51) Int. Cl.
*H02H 9/00* (2006.01)
(52) U.S. Cl. ........................................................ 361/56
(58) Field of Classification Search ............... 361/56, 361/212
See application file for complete search history.

(56) References Cited

U.S. PATENT DOCUMENTS

| 5,671,111 | A  | * | 9/1997 | Chen ........................... 361/56 |
| 6,338,986 | B1 | * | 1/2002 | Kawazoe et al. ............. 438/133 |
| 6,521,893 | B2 | * | 2/2003 | Stark ........................... 250/369 |
| 6,556,398 | B1 | * | 4/2003 | Chen ........................... 361/56 |
| 6,696,730 | B2 | * | 2/2004 | Kawazoe et al. ............. 257/355 |
| 2008/0080107 | A1 | * | 4/2008 | Chow et al. ................... 361/56 |

FOREIGN PATENT DOCUMENTS

| JP | 02-16764 | 1/1990 |
| JP | 09-148903 | 6/1997 |
| JP | 2002-305254 | 10/2002 |
| KR | 1020030059483 | 7/2003 |

OTHER PUBLICATIONS

Korean Patent Gazette, May 7, 2007.

* cited by examiner

*Primary Examiner*—Stephen W Jackson
*Assistant Examiner*—Angela Brooks
(74) *Attorney, Agent, or Firm*—Ladas & Parry LLP

(57) ABSTRACT

An electrostatic discharge (ESD) protection circuit protects a gate oxide of elements in an internal circuit against ESD. During an ESD test, if the sum of driving voltages of ESD protectors connected between a power pad and a ground pad is higher than the gate oxide breakdown voltage of elements in the internal circuit, the structure of the ESD protector is changed or another ESD protector is additionally provided so as to protect the gate oxide of the elements in the internal circuit against ESD.

9 Claims, 4 Drawing Sheets

ELECTROSTATIC DISCHARGE PROTECTION CIRCUIT AND ELECTROSTATIC DISCHARGE PROTECTION METHOD OF A SEMICONDUCTOR MEMORY DEVICE

CROSS-REFERENCE TO RELATED APPLICATIONS

The present application claims priority to Korean patent application number 10-2006-0034092 filed on Apr. 14, 2006, which is incorporated herein by reference in its entirety.

BACKGROUND OF THE INVENTION

The present invention relates to a semiconductor memory device, and more particularly to an electrostatic discharge protection circuit of a semiconductor memory device that protects the gate oxide of internal circuit elements against static electricity.

With the growing popularity of high integration in semiconductor technologies, the size of memory chips is decreasing, and electrostatic discharge (ESD) protection circuits, used to protect the internal circuit of the memory chip against static electricity, are becoming more complicated.

Moreover, in order to improve the operation of the memory chip, the gate oxide of internal circuit elements included in a semiconductor memory device is becoming thinner, which leads to a reduction in the breakdown voltage of the gate oxide of internal circuit elements.

Disadvantageously, for protection of the thin gate oxide, a protection circuit must be designed such that the driving voltage of the ESD protection element is smaller than the breakdown voltage of the gate oxide.

Referring to FIG. 1, the conventional semiconductor memory device is constructed such that a power clamp element GGN1 and a decoupling capacitor C1 are connected in parallel between a power pad 10 and a ground pad 20 while a power clamp element GGN2 is connected between the ground pads 20 and 30 in order to achieve ESD protection. The ground pads 20 and 30 are respectively supplied with different ground voltages.

Among semiconductor memory devices having the above described structure, an ESD protection circuit 50 is included in a fast and highly integrated semiconductor memory device employing a thin gate oxide. However, when ESD is generated, the ESD protection circuit 50 may cause erroneous operations due to a low electrostatic voltage. This is because the voltage held between the power pad 10 and the ground pad 30 increases by as much as the breakdown voltage of the gate oxide of elements in an internal circuit 40 using a power voltage VDD.

For example, referring to FIG. 2, the driving voltage Vt1 of the ESD protection circuit 50 is measured to be about 7.2V in a condition that a characteristic of the ESD protection circuit 50 shown in FIG. 1 is measured by using transmission line pulse (TLP) equipment, which shows a snapback current-voltage characteristic curve.

In this state, when the characteristics of voltage and current between the power pad 10 and the ground pad 30 are measured with the TLP equipment during an ESD test, as shown by the solid line in FIG. 3, the voltage V1 held between the power pad 10 and the ground pad 30 is measured to be about 10V. In addition, as shown by the dotted line in FIG. 3, a leakage current I1 is produced between the power pad 10 and the ground pad 30 when the voltage V1 is about 8.5V.

In this case, if the leakage current I1 is produced between the power pad 10 and the ground pad 30 when the voltage V1 held between the power pad 10 and the ground pad 30 is about 8.5V during the ESD test, the gate oxide of the elements in the internal circuit 40 is broken down.

As shown in FIG. 4, such a result can be understood by the fact that the breakdown voltage TLP-BVOX of the gate oxide of the elements in the internal circuit 40 having a gate oxide width GOP of 35 Å is measured to be about 8V when the breakdown voltage TLP-BVOX of the gate oxide of the elements in the internal circuit 40 is measured by using the TLP equipment.

In the conventional semiconductor memory device, the driving voltage of the ESD protection circuit 50 rises when ESD is generated. The driving voltage is increased due to the power line resistor R1 connected between the heterogeneous ground pads 20 and 30 and the capacitor C1 connected between the power pad 10 and the ground pad 20.

Referring to Table 1 below, if the resistance of the power line resistor R1 is 0.5Ω and the capacitance of the capacitor C1 is 1 nF, the driving voltage Vt1 of the ESD protection circuit 50 is maintained at about 7.6V regardless of the generation of ESD.

TABLE 1

|  | R1 = 0.5 Ω | | | R1 = 3.0 Ω | | |
| --- | --- | --- | --- | --- | --- | --- |
|  | C1 = 1 nF | C1 = 10 nF | C1 = 30 nF | C1 = 1 nF | C1 = 10 nF | C1 = 30 nF |
| Vt1 | 7.6 V | 7.8 V | 8.0 V | 8.1 V | 9.3 V | 10.6 V |
| It1 | 0.19 A | 0.62 A | 1.06 A | 0.19 A | 0.62 A | 1.06 A |

Here, It1 denotes the current flowing between the power pad 10 and the ground pad 30.

On the other hand, if the resistance of the power line resistor R1 is 3.0Ω and the capacitance of the capacitor C1 is 30 nF, the driving voltage Vt1 of the ESD protection circuit 50 rises to about 10.6V.

The power line resistor R1 and the capacitor C1 may result in ESD generation. If this is the case, the driving voltage Vt1 of the ESD protection circuit 50 may be higher than the voltage of the gate oxide of the elements in the internal circuit 40. The thin gate oxide of the elements in the internal circuit 40 may therefore break down due to ESD.

SUMMARY OF THE INVENTION

The present invention provides an electrostatic discharge (ESD) protection circuit and ESD method for protecting internal circuit elements against ESD, in which measurements are made to determine whether the driving voltage of the ESD protection circuit, which is connected between the power pad and ground pads supplied with different ground voltages at the occurrence of ESD, is designed to be lower than the gate oxide breakdown voltage of internal circuit elements. Should this requirement not be met, the ESD protection circuit is redesigned.

According to an aspect of the present invention, there is provided an ESD protection circuit that prevents ESD caused by an internal circuit supplied with a power voltage and different first and second ground voltages respectively provided from a power pad and first and second ground pads to operate the internal circuit, comprising: a first ESD protector that is connected between the power pad and the second ground pad so as to provide a first ESD path between the power pad and the second ground pad; and a second ESD protector that is connected between the first and second ground pads to provide a second ESD path between the first and second ground pads, wherein, during an ESD test, if the driving voltage of the first ESD protector is higher than the gate oxide breakdown voltage of elements in the internal circuit, a third ESD protector is additionally connected between the power pad and the first ground pad so as to provide a third ESD path.

In the aforementioned aspect of the present invention, during the ESD test, if the sum of the driving voltages of the first and second ESD protectors is higher than the gate oxide breakdown voltage of the elements in the internal circuit or if the current flowing at the time when the first ESD protector starts its operation and a voltage drop caused by a line resistor connected to the power pad is higher than the value obtained by subtracting the driving voltages of the first and second ESD protectors from the gate oxide breakdown voltage of the elements in the internal circuit, the third ESD protector may be connected between the power pad and the first ground pad.

In addition, the driving voltage of the third ESD protection circuit may be lower than the driving voltage of the first ESD protector.

In addition, the third ESD protector may be composed of at least one or more MOS transistor type power clamp elements, in each of which a gate and one end is commonly connected to the first ground pad and the other end is connected to the power pad.

In addition, two or more of the MOS transistor type power clamp elements may be connected in parallel between the power pad and the first ground pad.

In addition, each of the MOS transistor type power clamp elements may be constructed such that the gate and one end is commonly connected to the first ground pad and the other end is connected to the power pad.

In addition, the first ESD protector may be composed of an NMOS transistor type power clamp element of which a gate and one end are commonly connected to the second ground pad and the other is connected to the power pad.

In addition, the second ESD protector may be composed of an NMOS transistor type power clamp element of which a gate and one end is commonly connected to the first ground pad and the other is connected to the second ground pad.

In addition, during the ESD test, if the sum of the driving voltages of the first and second ESD protectors is higher than the gate oxide breakdown voltage of the elements in the internal circuit or if the current flowing at the time when the first ESD protector starts its operation and a voltage drop caused by a line resistor connected to the power pad is higher than a value obtained by subtracting the driving voltages of the first and second ESD protectors from the gate oxide breakdown voltage of the elements in the internal circuit, the second ESD protector may be composed of one or more diodes, in each of which a cathode is connected to the first ground pad and an anode is connected to the second ground pad.

In addition, when two or more of the diodes are connected, the respective diodes may be connected in parallel between the first ground pad and the second ground pad.

According to another aspect of the present invention, there is provided an ESD protection method of a semiconductor memory device, comprising steps of (1) in order to prevent ESD caused by an internal circuit supplied with a power voltage and different first and second ground voltages respectively provided from a power pad and first and second ground pads, connecting the first ESD protector in parallel between the power pad and the second ground pad and connecting the second ESD protector between the first and second ground pads; (2) after supplying an alternating current (AC) corresponding to ESD during an ESD test, measuring the driving voltage of the first ESD protector and the gate oxide breakdown voltage of elements in the internal circuit; and (3) if the measured driving voltage of the first ESD protector is higher than the gate oxide breakdown voltage of the elements in the internal circuit, connecting additionally a third ESD protector between the power pad and the first ground pad in order to decrease the driving voltage of the first ESD protector.

In the aforementioned aspect of the present invention, in step (3), during the ESD test, if the sum of the driving voltages of the first and second ESD protectors is higher than the gate oxide breakdown voltage of the elements in the internal circuit or if the current flowing at the time when the first ESD protector starts its operation and the voltage drop caused by a line resistor connected to the power pad is higher than the value obtained by subtracting the driving voltages of the first and second ESD protectors from the gate oxide breakdown voltage of the elements in the internal circuit, the third ESD protector may be additionally connected.

In addition, in step (3), if the measured driving voltage of the first ESD protector is higher than the gate oxide breakdown voltage of the elements in the internal circuit, the third ESD protector of which the driving voltage is lower than that of the first ESD protector may be additionally connected.

In addition, in step (3), if the measured driving voltage of the first ESD protector is higher than the gate oxide breakdown voltage of the elements in the internal circuit, the third ESD protector may be composed of one or more MOS transistor type power clamp elements in each of which a gate and one end is commonly connected to the first ground pad and the other end is connected to the power pad.

In addition, in steps (1) and (3), during the ESD test, if the sum of the driving voltages of the first and second ESD protectors is higher than the gate oxide breakdown voltage of the elements in the internal circuit or if the current flowing at the time when the first ESD protector starts its operation and the voltage drop caused by a line resistor connected to the power pad is higher than the value obtained by subtracting the driving voltages of the first and second ESD protectors from the gate oxide breakdown voltage of the elements in the internal circuit, the second ESD protector may be composed of one or more diodes, in each of which a cathode is connected to the first ground pad while an anode is connected to the second ground pad.

DETAILED DESCRIPTION OF SPECIFIC EMBODIMENTS

Figure 1:
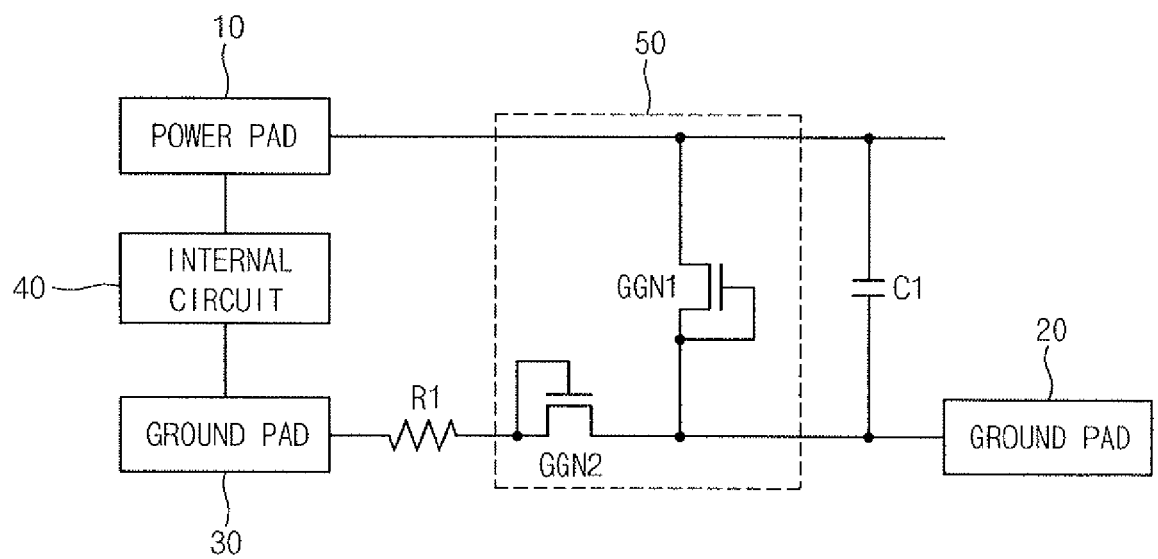
FIG. 1 is a circuit diagram of an electrostatic discharge protection circuit in the conventional semiconductor memory device.
Figure 2:
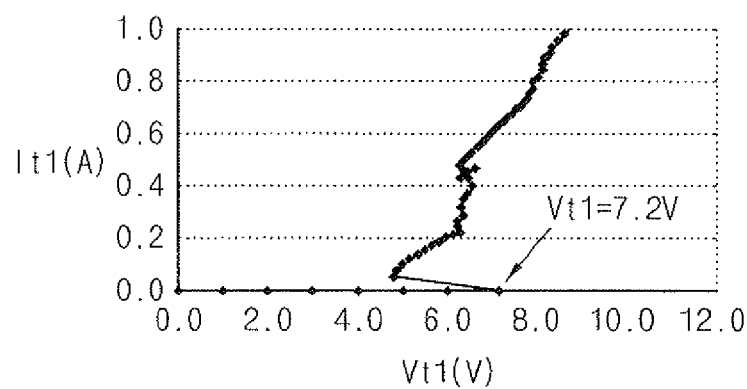
FIG. 2 is a graph illustrating a characteristic of a power clamp element of FIG. 1 during a general test.
Figure 3:
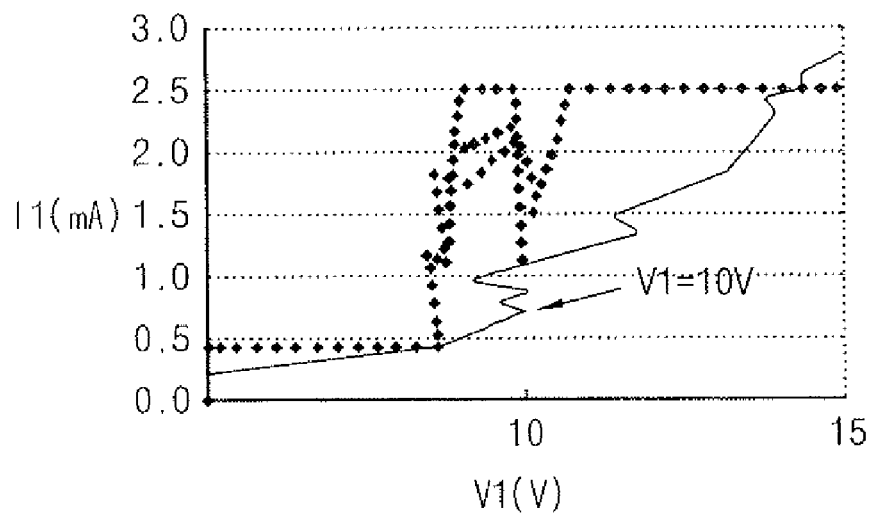
FIG. 3 is a graph illustrating characteristics of voltage and current between a power pad and a ground pad of FIG. 1 during a general test.
Figure 4:
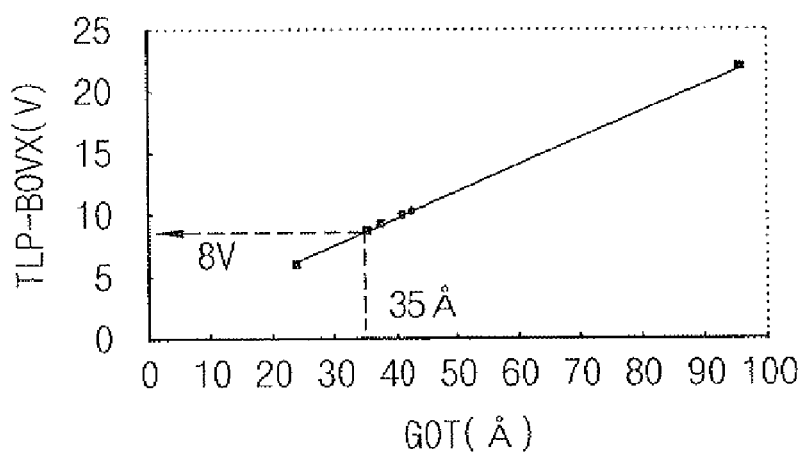
FIG. 4 is a graph illustrating a gate oxide breakdown voltage of internal circuit elements with respect to a gate oxide thickness, measured using test equipment.
Figure 5:
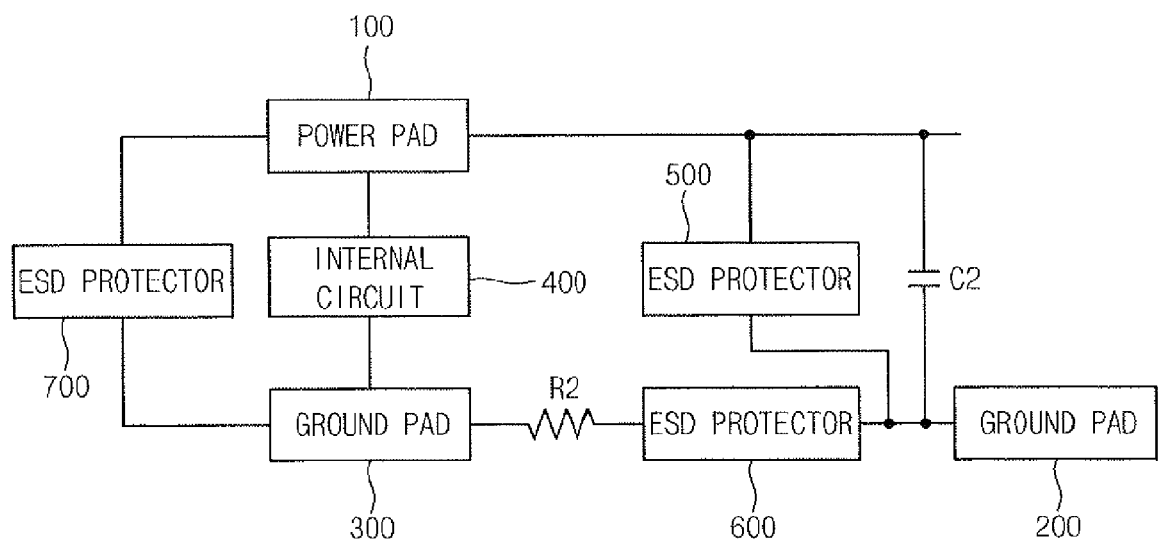
FIG. 5 is a block diagram illustrating a part of a semiconductor device having an ESD protection circuit according to an embodiment of the present invention.

FIG. 5 is a block diagram of an electrostatic discharge (ESD) protection circuit according to an embodiment of the present invention. In this embodiment, during an ESD test, if the sum of driving voltages of the ESD protectors 500 and 600, which are connected between the power pad 100 and ground pads 200 and 300, is higher than the gate oxide breakdown voltage of elements in the internal circuit 400, the structure of the ESD protector 600 is changed or an ESD protector 700 is additionally provided so as to protect the gate oxide of the elements in the internal circuit 400 against ESD.

Specifically, the circuit of FIG. 5 includes, inter alia: the internal circuit 400 connected between the power pad 100 and the ground pad 300; the ESD protector 500 connected between the power pad 100 and the ground pad 200 to provide an ESD path; a decoupling capacitor C2 connected between the power pad 100 and the ground pad 200; and the ESD protector 600 connected between the ground pads 200 and 300 to provide an ESD path. The ground pads 200 and 300 are respectively supplied with different ground voltages.

Another ESD protector 700 may be additionally provided, which is composed of at least one or more power clamp elements, connected in parallel between the power pad 100 and the ground pad 300. In addition, the ESD protector 600 may be composed of at least one or more power clamp elements or diodes connected in parallel between the ground pads 200 and 300.

Figure 6:
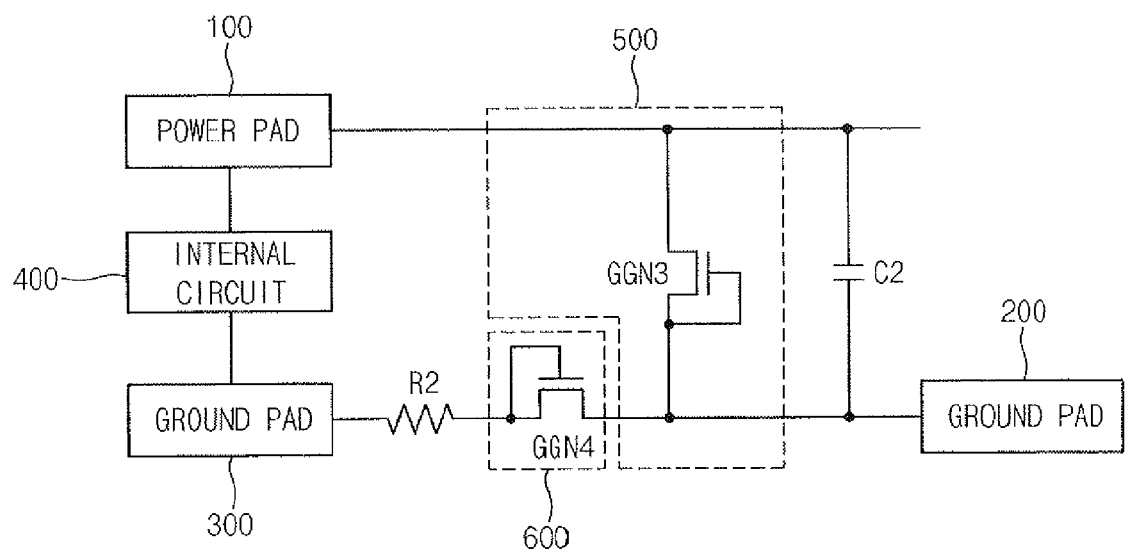
FIG. 6 is a circuit diagram illustrating an example of a general ESD protection circuit connected between a power pad and ground pads.

As shown in FIG. 6, if the ESD protector 500 is composed of a power clamp element GGN3 while the ESD protector 600 is composed of a power clamp element GGN4, the voltage held between the power pad 100 and the ground pad 300 during the ESD test is compared with the gate oxide breakdown voltage of the elements in the internal circuit 400.

Each of the power clamp elements GGN3 and GGN4 is an NMOS transistor of which a gate is connected to one end as a common node. During the ESD test, test equipment such as transmission line pulse (TLP) equipment is used to measure driving voltages of the power clamp elements GGN3 and GGN4 and the gate oxide breakdown voltage of the elements in the internal circuit 400.

In the circuit constructed as shown in FIG. 6, a voltage held between the power pad 100 and the ground pad 300 during the ESD test may be obtained by using Equation 1.

$$V2 = Vt2\_1 + I2*R2 + Vt2\_2 \quad \text{[Equation 1]}$$

Where, 'V2' denotes a voltage held between the power pad 100 and the ground pad 300; 'Vt2_1' denotes a driving voltage of the power clamp element GGN3; 'I2' denotes the current flowing between the power pad 100 and the ground pad 300 at the time when the power clamp element GGN3 starts its operation.

In addition, 'R2' denotes the resistance of the power line connecting the ground pad 200 and the ground pad 300. 'Vt2_2' denotes a driving voltage of the power clamp element GGN4.

As described above, in the circuit of FIG. 6, the voltage held between the power pad 100 and the ground pad 300 may be expressed by Equation 1. During the ESD test, if the requirements of Equations 2a and 2b are not satisfied, the structure of the ESD protector 600 may be changed or the ESD protector 700 may be additionally provided.

$$Vt2\_1 + Vt2\_2 < BVox \quad \text{[Equation 2a]}$$

$$It2*R2 < Bvox - Vt2\_1 - Vt2\_2 \quad \text{[Equation 2b]}$$

where, 'BVox' denotes the gate oxide breakdown voltage of the elements in the internal circuit 400.

Specifically, Equation 2a is applied when the sum of the driving voltages of the power clamp elements GGN3 and GGN4 is lower than the gate oxide breakdown voltage of the elements in the internal circuit 400.

Furthermore, Equation 2b is applied when the current flowing between the power pad 100 and the ground pad 300 at the time when the power clamp element GGN3 starts its operation and a voltage drop caused by the resistance of the power line connecting the ground pad 200 and the ground pad 300 is lower than the value obtained by subtracting the driving voltages of the power clamp elements GGN3 and GGN4 from the gate oxide breakdown voltage of the elements in the internal circuit 400.

If the requirements of Equations 2a and 2b are not satisfied, the structure of the ESD protector 600 may be changed or the ESD protector 700 may be additionally provided.

Figure 7A:
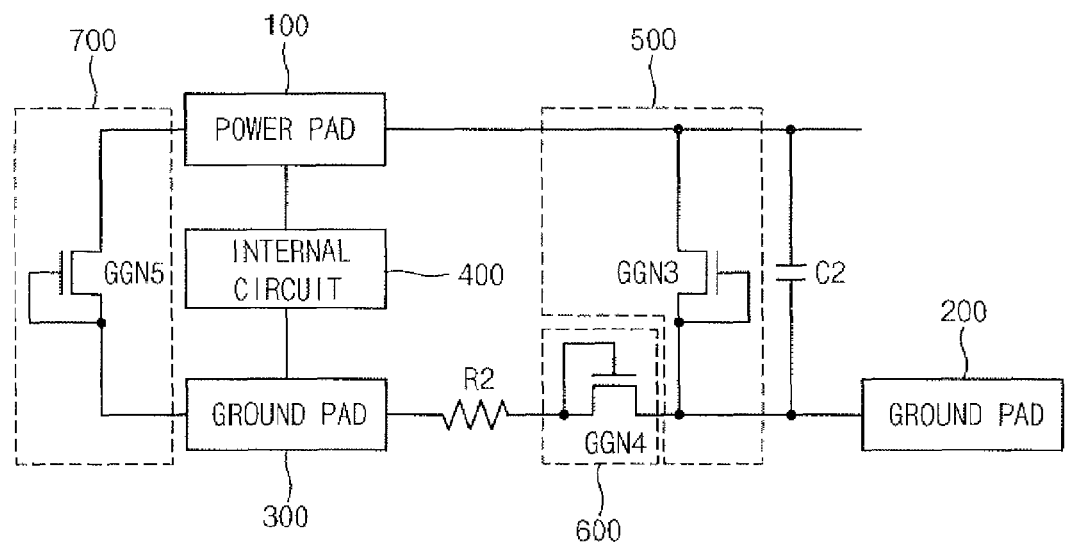
FIG. 7A is a circuit diagram illustrating an example of a modified structure of the ESD protection circuit of FIG. 6.

For example, as shown in FIG. 7A, the ESD protector 700, having at least one power clamp element GGN5, is additionally connected between the power pad 100 and the ground pad 300. In this case, the additionally provided power clamp element GGN5 may be composed of an NMOS transistor in which a gate and one end is commonly connected to the ground pad 300 and the other end is connected to the power pad 100. If two or more power clamp elements GGN5 are additionally connected, the respective power clamp elements GGN5 are connected in parallel between the power pad 100 and the ground pad 300.

Figure 7B:
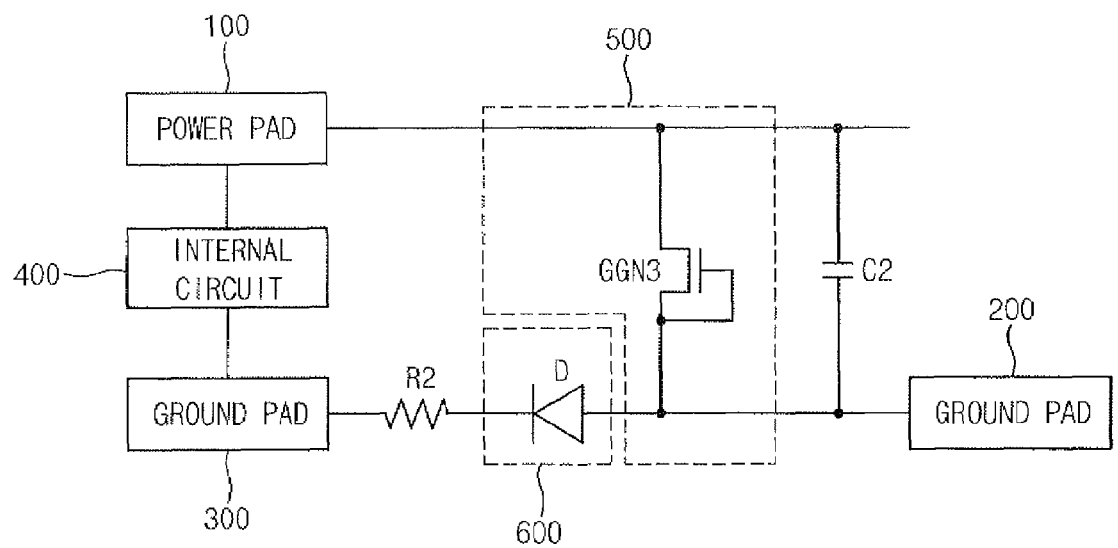
FIG. 7B is a circuit diagram illustrating another example of a modified structure of the ESD protection circuit of FIG. 6.

For another example, as shown in FIG. 7B, the power clamp element GGN4 connected between the ground pads 200 and 300 of FIG. 6 is replaced with at least one or more diodes D. In this case, the cathode of the diode D is connected to the ground pad 300 while the anode of the diode D is connected to the ground pad 200. When two or more of the diodes D are connected, the respective diodes D are connected in parallel between the ground pads 200 and 300.

For yet another example, the resistance R2 is reduced by minimizing the length of the power line connecting the ground pads 200 and 300 or by using a metal wire having a low resistance as the power line.

As described above, if the voltage held between the power pad 100 and the ground pad 300 during the ESD test (i.e. the sum of the driving voltages of the ESD protectors 500 and 600) is lower than the gate oxide breakdown voltage of the elements in the internal circuit 400, the circuit of FIG. 6 is used without alternation.

In addition, if the sum of the driving voltage of the ESD protectors 500 and 600 is higher than the gate oxide breakdown voltage of the elements in the internal circuit 400 during the ESD test, as shown in FIGS. 7A and 7B, at least one or more methods are used selected from a method of changing the structure of the ESC protector 600, a method of additionally providing the ESD protector 700, and a method of reducing the resistance R2 of the power line connecting the ground pads 200 and 300 such that the driving voltages of the ESD protectors 500 and 600 become lower than the gate oxide breakdown voltage of the elements in the internal circuit 400.

As a result, if the sum of the driving voltages of the ESD protectors 500 and 600 is higher than the gate oxide breakdown voltage of the elements in the internal circuit 400 during the ESD test, at least one or more methods are used selected from the method of changing the structure of the ESC protector 600, the method of additionally providing the ESD protector 700, and the method of reducing the resistance R2 of the power line connecting the ground pads 200 and 300 such that the internal circuit 400 can be avoided from erroneous operations caused by ESD.

Furthermore, since its structure changes in advance through the ESD test such that the driving voltages of the ESD protectors 500 and 600 are lower than the gate oxide breakdown voltage of the elements in the internal circuit 400, the erroneous operations caused by ESD can be reduced in a cost effective manner after a memory chip is completed while decreasing the development lead-time.

According to an embodiment of the present invention, during an electrostatic discharge (ESD) test, if a driving voltage of an ESD protection circuit connected between a power pad and ground pads supplied with different ground voltages is higher than the gate oxide breakdown voltage of an internal circuit supplied with a power voltage from the power pad, changing the structure of the ESD protection circuit can reduce the number of erroneous operations of the internal circuit caused by ESD.

In addition, since the structure of the ESD protection circuit is changed through the ESD test prior to a design process, the erroneous operations caused by ESD can be reduced in a cost effective manner after a memory chip is completed while decreasing the development lead-time.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An electrostatic discharge (ESD) protection circuit that prevents ESD caused by an internal circuit supplied with a power voltage and different first and second ground voltages respectively provided from a power pad and first and second ground pads to operate the internal circuit, comprising:
    a first ESD protector connected between the power pad and the second ground pad so as to provide a first ESD path between the power pad and the second ground pad;
    a second ESD protector connected between the first and second ground pads to provide a second ESD path between the first and second ground pads; and
    a third ESD protector connected between the power pad and the first ground pad and configured to make driving voltages of the first and second protectors become lower than a gate oxide breakdown voltage of elements in the internal circuit by providing a third ESD path,
    wherein, during an ESD test, if the sum of the driving voltages of the first and second ESD protectors is higher than the gate oxide breakdown voltage of the elements in the internal circuit or if the current flowing at the time when the first ESD protector starts its operation and the voltage drop caused by a line resistor connected to the power pad is higher than a value obtained by subtracting the driving voltages of the first and second ESD protectors from the gate oxide breakdown voltage of the elements in the internal circuit, the third ESD protector is connected between the power pad and the first ground pad.

2. The ESD protection circuit according to claim 1, wherein a driving voltage of the third ESD protection circuit is lower than the driving voltage of the first ESD protector.

3. The ESD protection circuit according to claim 1, wherein the third ESD protector is composed of at least one or more NMOS transistor type power clamp elements in each of which a gate and one end is commonly connected to the first ground pad and the other end is connected to the power pad.

4. The ESD protection circuit according to claim 3, wherein, if two or more of the MOS transistor type power clamp elements are connected, the respective MOS transistor type power clamp elements are connected in parallel between the power pad and the first ground pad.

5. The ESD protection circuit according to claim 4, wherein each of the MOS transistor type power clamp elements is constructed such that a gate and one end is commonly connected to the first ground pad and the other end is connected to the power pad.

6. The ESD protection circuit according to claim 1, wherein the first ESD protector is composed of an NMOS transistor type power clamp element of which a gate and one end is commonly connected to the second ground pad and the other is connected to the power pad.

7. The ESD protection circuit according to claim 1, wherein the second ESD protector is composed of an NMOS transistor type power clamp element of which a gate and one end is commonly connected to the first ground pad and the other end is connected to the second ground pad.

8. An electrostatic discharge (ESD) protection circuit that prevents ESD caused by an internal circuit supplied with a power voltage and different first and second ground voltages respectively provided from a power pad and first and second ground pads to operate the internal circuit, comprising:
    a first ESD protector connected between the power pad and the second ground pad so as to provide a first ESD path between the power pad and the second ground pad; and
    a second ESD protector connected between the first and second ground pads and composed of one or more diodes in each of which a cathode is connected to the first ground pad and an anode is connected to the second ground pad to provide a second ESD path between the first and second ground pads, wherein the diodes are configured to make driving voltages of the first and second protectors become lower than a gate oxide breakdown voltage of elements in the internal circuit,
    wherein, during an ESD test, if the sum of the driving voltages of the first and second ESD protectors is higher than the gate oxide breakdown voltage of the elements in the internal circuit or if the current flowing at a time when the first ESD protector starts its operation and the voltage drop caused by a line resistor connected to the power pad is higher than the value obtained by subtracting the driving voltages of the first and second ESD protectors from the gate oxide breakdown voltage of the elements in the internal circuit, the second ESD protector is composed of the diodes.

9. The ESD protection circuit according to claim 8, wherein, when two or more of the diodes are connected, the respective diodes are connected in parallel between the first ground pad and the second ground pad.

* * * * *